United States Patent
Fuchs

(10) Patent No.: US 9,438,085 B2
(45) Date of Patent: Sep. 6, 2016

(54) ELECTROMECHANICAL CONVERTER SYSTEM FOR AN ELECTRIC VEHICLE WITH ENHANCED COOLING

(75) Inventor: Andreas Fuchs, Bern (CH)

(73) Assignee: Swissmove AG, Emmenbruecke (CH)

(*) Notice: Subject to any disclaimer, the term of this patent is extended or adjusted under 35 U.S.C. 154(b) by 369 days.

(21) Appl. No.: 13/981,305

(22) PCT Filed: Jan. 28, 2011

(86) PCT No.: PCT/EP2011/051260
§ 371 (c)(1),
(2), (4) Date: Jul. 23, 2013

(87) PCT Pub. No.: WO2012/100838
PCT Pub. Date: Aug. 2, 2012

(65) Prior Publication Data
US 2013/0313930 A1    Nov. 28, 2013

(51) Int. Cl.
*H02K 7/116* (2006.01)
*B62M 6/65* (2010.01)
(Continued)

(52) U.S. Cl.
CPC ............ *H02K 7/116* (2013.01); *B60K 7/0007* (2013.01); *B60K 17/046* (2013.01); *B62M 6/65* (2013.01);
(Continued)

(58) Field of Classification Search
CPC ........ H02K 7/006; H02K 7/10; H02K 7/116; H02K 7/1846
USPC ............... 310/75 R, 67 A, 80, 83, 91, 96, 99
See application file for complete search history.

(56) References Cited

U.S. PATENT DOCUMENTS 5,778,998 A    7/1998 Shih
6,278,216 B1   8/2001 Li
(Continued)

FOREIGN PATENT DOCUMENTS

CN    1815856 A    8/2006
CN    201439376 U  4/2010
(Continued)

OTHER PUBLICATIONS

International Search Report, dated Oct. 25, 2011 (English translation as provided by WIPO only).
(Continued)

*Primary Examiner* — Michael Andrews
(74) *Attorney, Agent, or Firm* — Dienwiebel Transatlantic IP; T. Dienwiebel

(57) ABSTRACT

The invention relates to a converter system (1, 1', 1") for an electric vehicle and in particular a lightweight electric vehicle. The converter system (1, 1', 1") has a supporting housing (10, 10', 10") for connecting to the vehicle, has an electromechanical energy converter arranged at least partially in the supporting housing (10, 10', 10"), said electromechanical energy converter having at least one stator (21, 21') and a rotor (22, 22') which is rotatable relative to the stator (21, 21') about a drive axis (7, 40), and has a power transmitting device which connects the rotor (22, 22') to a connection element. To permit a particularly cheap design which is easy to maintain and to reduce thermal problems, the supporting housing (10, 10', 10") has at least one first (14) and one second axial portion (15). wherein (the first portion (14) has a greater diameter than the second portion (15) in a direction transversely with respect to the drive axis (7, 40). Here, the second portion (15) of the supporting housing (10, 10', 10") is formed for mourning the rotor (22, 22') and/or the connection element. The rotor (22, 22') and stator (21, 21') of the energy converter are arranged at least partially in the first portion (14) of the supporting housing (10, 10', 10").

17 Claims, 5 Drawing Sheets

(51) Int. Cl.
  *B62M 7/12* (2006.01)
  *B60K 7/00* (2006.01)
  *B60K 17/04* (2006.01)

(52) U.S. Cl.
  CPC ......... *B62M 7/12* (2013.01); *B60K 2007/0038* (2013.01); *B60K 2007/0092* (2013.01); *B60W 2300/36* (2013.01); *B60Y 2200/12* (2013.01); *B60Y 2200/13* (2013.01); *B62K 2204/00* (2013.01)

(56) References Cited

U.S. PATENT DOCUMENTS

2005/0264111 A1* 12/2005 Tanaka ............... H02K 7/116
 310/67 A
2009/0305831 A1* 12/2009 Moeller ............... H02K 51/00
 475/5

FOREIGN PATENT DOCUMENTS

| DE | 101 27 769 A1 | 12/2002 |
| DE | 20 2004 010 269 U1 | 9/2004 |
| EP | 0 937 600 A2 | 8/1999 |
| EP | 0 980 821 A2 | 2/2000 |
| EP | 1 601 083 A1 | 11/2005 |
| EP | 1 642 820 A1 | 4/2006 |
| FR | 2 873 090 A1 | 1/2006 |

OTHER PUBLICATIONS

Written Opinion of the International Searching Authority, dated Oct. 25, 2011 (English translation as provided by WIPO only).

Search Report of Nordic Patent Institute of Aug. 5, 2010.

* cited by examiner

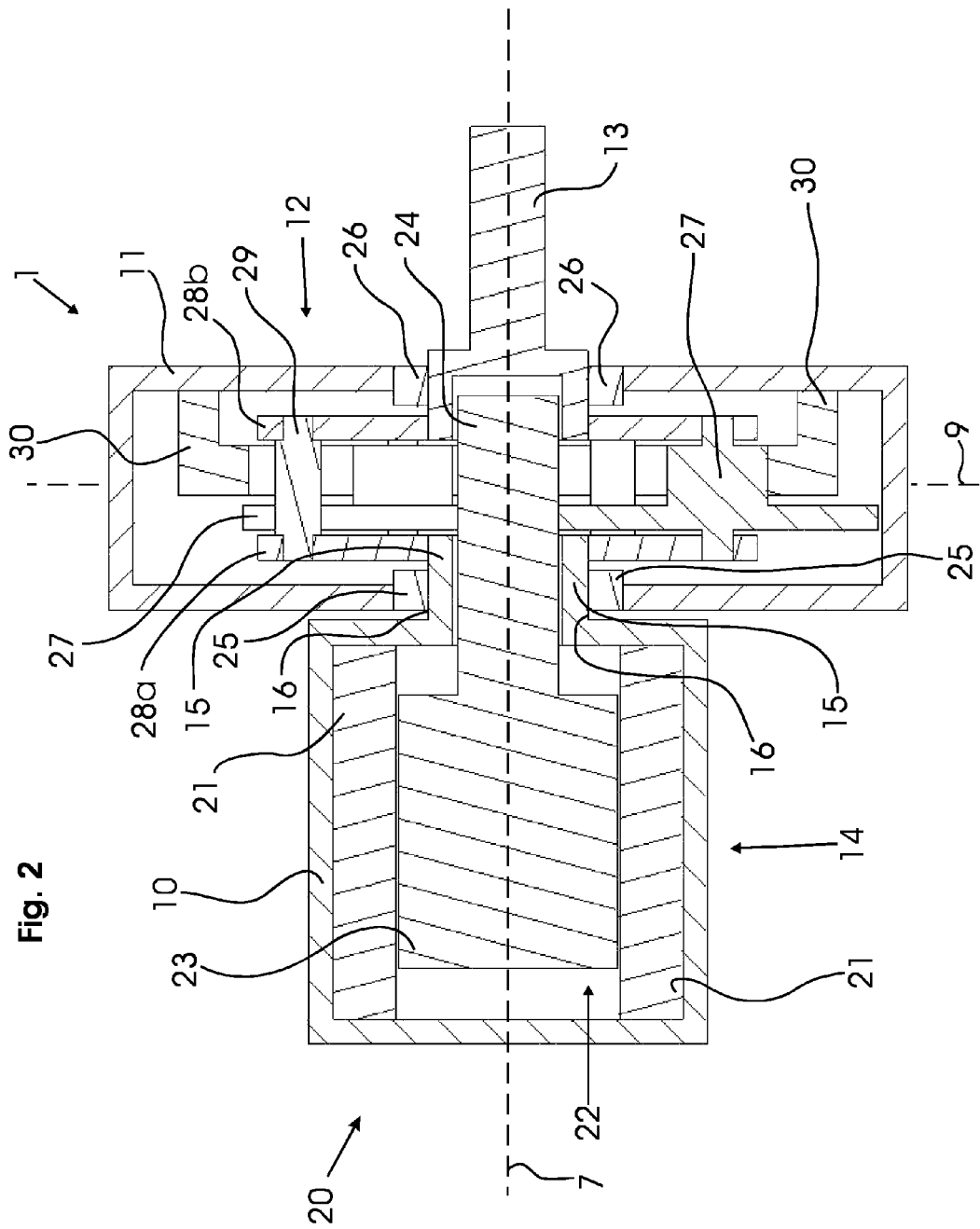

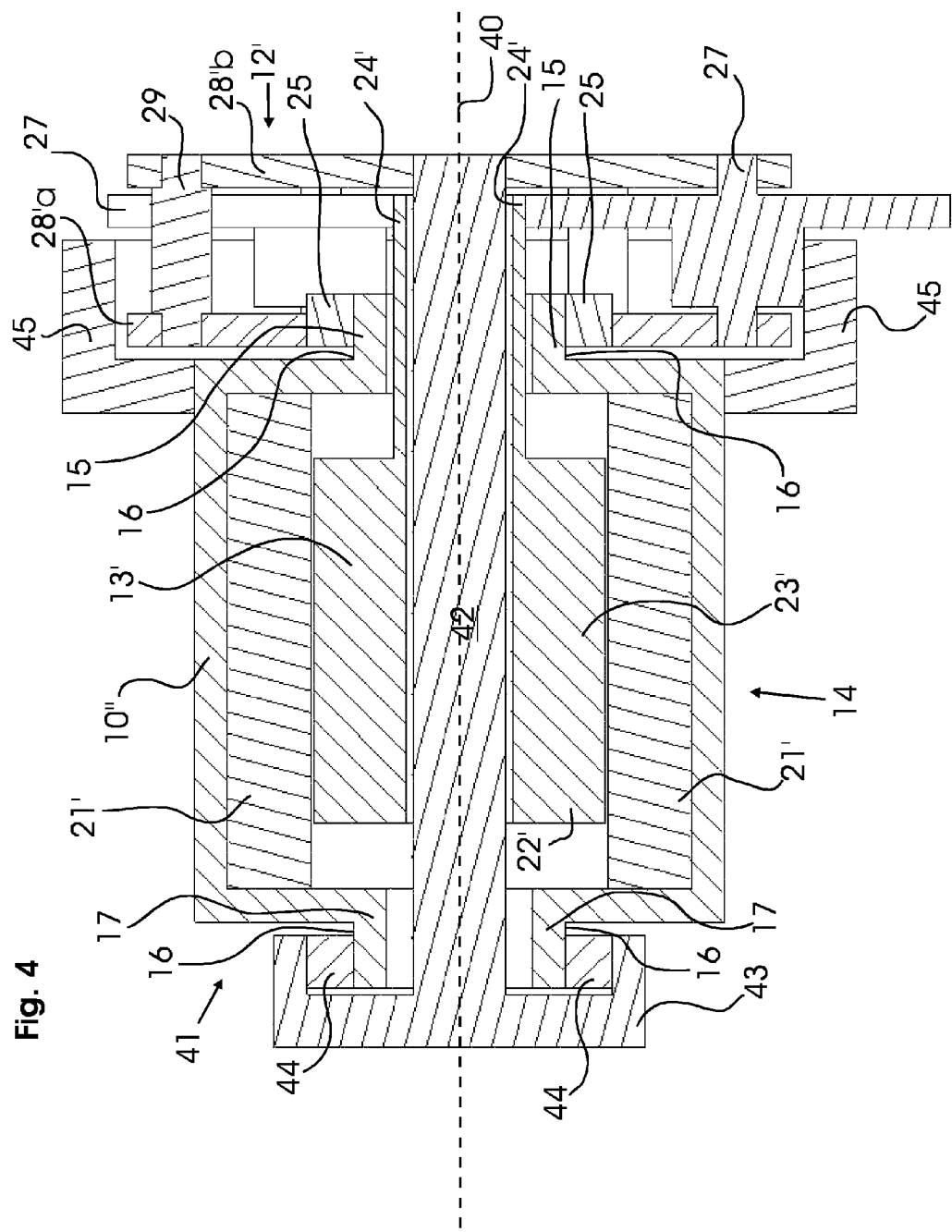

ELECTROMECHANICAL CONVERTER SYSTEM FOR AN ELECTRIC VEHICLE WITH ENHANCED COOLING

The invention concerns an electromechanical converter system for an electric vehicle and in particular a light electric vehicle.

BACKGROUND

Electrical or electromechanical converter systems for vehicles are known in prior art and are for instance used to convert electrical energy for the propulsion of a so-called electric vehicle into mechanical driving energy. In another application, electromechanical converter systems in vehicles are being used to generate electrical energy from mechanical work. This includes for example motor vehicle generators that generate electrical energy from the work of a combustion engine for the supply of electrical wheel drives (range extender).

Due to increasing energy prices, a variety of vehicle types have been refined quite recently, such as for example electric cars, but also novel types have been introduced, particularly in the area of light electric vehicles. In addition to electric bicycles, also referred to as "e-bikes", now also electric scooters and electric mopeds suitable for daily use are available. These are generally completely or partially powered by electrical energy via an electromechanical converter system, such as an electric motor.

A particular type of a light electric vehicle is a so-called "hybrid e-bike" which is at least partially propelled by electrical energy, but can generally also be propelled aided by muscular power of a user. Especially with the latter vehicle type, also electromechanical converter systems operating as generators can be used in addition to electric motors to convert the mechanical energy generated by the user into electrical energy and to either supply this energy directly to a motor or to store it temporarily.

Electromechanical converter systems currently available are however not ideally adapted for the use in an electric vehicle and especially in a light electric vehicle and often exhibit only inadequate efficiency. However, especially the efficiency determines the range of the vehicle, relevant in practice.

Common converter systems, as for instance wheel hub motors, generate high temperatures during operation due to their design, resulting in high maintenance costs with a short service life of the converter system.

SUMMARY

An object is to provide an electrical converter system for vehicles that is adapted to the technical requirements of electric vehicles and in particular of light electric vehicles, allows easy maintenance and has long service life.

The object is solved by an electrical converter system according to claim 1 and an electric vehicle according to claim 15. The dependent claims describe embodiments of the invention.

One aspect of the invention is the specific arrangement of at least an electromechanical energy converter in a support housing with at least a first and a second axial section, wherein the first section has a larger diameter than the second section perpendicularly to a drive axis. The energy converter is formed with a stator and a rotor, wherein the stator and the rotor are at least partially arranged in the first section. The second section is formed for bearing of the rotor or of a connecting element.

Hereby it is possible to dissipate the thermal energy mainly produced in the stator during operation of the energy converter in an advantageous way via a large surface of the support housing, while the second section is adapted to the bearing of the rotor and/or the connecting element. Thus it is for instance possible to use particularly cost-effective and/or low-maintenance bearings.

The converter system according to the invention thus allows enhanced heat dissipation and reduced manufacturing costs at the same time. Due to the enhanced heat dissipation, the maintenance cost is moreover reduced as all parts of the converter system are subject to less thermal load. This is particularly in that case advantageous when the energy converter and/or power transmission device are being operated with lubricants, as with less thermal load the lubricant can be ideally adjusted to a high level of efficiency.

In the context of the present invention, an electric vehicle is understood to mean a single- or multi-track vehicle that is at least partially electrically powered and particularly a road vehicle. In an embodiment, the electric vehicle is a light electric vehicle, as for instance an electric two-wheeler or three-wheeler or an electric bicycle, pedelec, scooter, wheelchair, quad bike or kart. The light electric vehicle may have an empty weight of not more than 500 kg in one embodiment, furthermore not more than 100 kg including batteries in a further embodiment.

According to the invention, the converter system comprises a support housing for connection to the vehicle. The support housing comprises at least partially an electromechanical energy converter with at least a rotor and a stator and is, as discussed at the beginning, formed for connection to the vehicle. Accordingly, the support housing can be formed for instance for screw connection, plug connection or weld connection to the electric vehicle or to the frame or the body of the vehicle.

The at least one electromechanical energy converter acts for transformation of electrical into mechanical energy and/or for transformation of mechanical into electrical energy. The electromechanical energy converter can thus in an embodiment comprise one or more electrical machines such as electric motors and/or generators. Certainly it is not necessary that the electromechanical energy converter can work both in generator operation mode, in which electrical energy is being generated from mechanical energy, and in motor operation mode, in which mechanical energy is being generated from electrical energy.

The at least one rotor is arranged being rotatable about a drive axis relative to the stator and is connected to a power transmission device that connects the rotor with a connecting element. At this, the power transmission device can comprise any suitable design to transfer a torque from the rotor to the connecting element and/or from the connecting element to the rotor.

The connecting element acts as input and/or output of the converter system and can as well be of any suitable design. Certainly, material and design should be chosen according to the forces occurring in the specific application. The connecting element can for example comprise a shaft and/or a flange and is in an embodiment at least partially arranged outside the support housing to allow easy connection to other components of the vehicle.

According to another embodiment, the connecting element is formed for connection to a wheel assembly such as a hub of a drive wheel or impeller wheel for an electric vehicle, for instance in case of application of the system as a motor. According to further embodiment, the connecting element is formed integrally with a wheel hub. In this case, the connecting element can be formed appropriately for example with a mechanical, a hydraulic or an electromagnetic braking device.

Alternatively and in another embodiment, the connecting element can be formed for connection to a bottom bracket shaft, for example in case of application as bottom bracket generator or bottom bracket motor. In this example, the connecting element may be formed integrally with the bottom bracket shaft. In another embodiment, the connecting element may comprise one or more sprockets or tooth discs so that propulsion of a wheel assembly of the electric vehicle can take place for instance via a chain or a toothed belt.

According to the invention, the support housing comprises at least a first axial section and a second axial section wherein the first axial section has a larger diameter than the second section in a direction, lateral or perpendicular to the drive axis. The first and second sections are arranged in one direction, parallel to the drive axis, i.e. axially.

The stator and the rotor of the energy converter are at least partially arranged in the first section of the support housing. The second section is formed for bearing of the rotor and/or the connecting element and can comprise for example a bearing unit such as a roller bearing or radial bearing.

The above-described arrangement of energy converter, power transmission device and connecting element allows an assembly simple in design and thus cost-efficient. Further the forming of the support housing with at least a first section and a second section with different diameter allows a particularly good cooling capability, as the enlarged diameter of the first section results in an enlarged surface of the support housing in the area of the stator. As heat in the electromechanical energy converter develops mainly in the area of the stator, the arrangement thus allows a good cooling of the electromechanical converter while at the same time the second section allows an ideal bearing of the rotor and/or the connecting element.

Thus for example, the performance of a wheel drive in relation to the maximum torque may be increased with a given energy converter. As a result, for example the payload with regard to the pulling force of a trailer, but also the climbing ability and climbing power of a corresponding electric vehicle is improved in an advantageous way.

As already stated at the beginning, the electromechanical energy converter may comprise any suitable device that converts electrical energy into mechanical energy or mechanical energy into electrical energy.

The stator of the energy converter is, as discussed at the beginning, at least partially arranged in the first section of the support housing. To achieve enhanced heat dissipation, the stator is in an embodiment completely arranged in the first section.

Depending on the design of the electromechanical energy converter, the stator can for instance be formed with permanent magnetic pole shoes or electromagnets or coils to generate a corresponding magnetic field in operation. The rotor can for example comprise one or more coil arrangements that are connected to a mechanical commutator arrangement where required. According to an embodiment, the rotor is formed with permanent magnetic elements. Thus the converter can be operated with an electronic commutation, i.e. without brushes. Certainly, the rotor can further comprise one or more bearing arrangements by which the rotor is fixed or mounted to the support housing.

According to another embodiment, the electromechanical energy converter comprises at least a motor and/or a generator. Certainly, the corresponding motor or generator may be adapted to the specific requirements of the electric vehicle, in particular concerning the power.

The electromechanical energy converter according to the invention in an embodiment can for instance be formed as axial flux machine, transverse flux machine or radial flux machine. Internal or external rotor arrangements are conceivable, wherein for reasons of heat dissipation an internal rotor arrangement may be used, i.e., an arrangement in which the hollow-cylinder-shaped stator surrounds the rotor in a direction, perpendicular to the drive axis. According to an embodiment, the energy converter is formed as brushless direct current machine (BDLC) or synchronous machine (PMSM). Furthermore, use of a so-called "ironless" machine is conceivable in another embodiment, for instance of a machine with ironless stator, to be able to set aside mechanical freewheels and allow efficient electronic freewheels.

If the electromechanical energy converter comprises multiple motors, their phases can be connected in parallel or in series in corresponding embodiments and according to the application. If appropriate, the electromechanical energy converter may comprise a control device to control the operation of the converter and to guarantee maximum efficiency.

The control device may for example be formed for single- or multi-quadrant operation (1 to 4 quadrants), wherein in case of a multi-quadrant operation both motor operation or generator operation is possible. Hence the converter system is particularly versatile.

In an alternative or additional embodiment, the control device can be formed for electronic commutation. For this purpose, the control device can comprise appropriately at least a rotor position sensor such as a Hall sensor or a "magnetic hall encoder".

The control device may in another embodiment furthermore be formed to allow electronic freewheel of the energy converter system. Here, for example in case of a motor, the motor is being operated in a mode with low driving power at an operating point with particularly low power dissipation.

Likewise, in case of multiple motors/generators, the control device may in another embodiment be formed for switchable connection of individual machines with the connecting element, for example by using an electromagnetic clutch. Such a design further allows a load distribution, especially in case of different motors/generators or motors/generators with different operating points.

The control device may in one embodiment be integrally formed with the electromechanical converter. For example, the control device may be connected to the converter via plug connection to allow easy disassembling in case of maintenance.

As already discussed in the preceding, the support housing may be formed for connection to the vehicle and may comprise at least partially the electromechanical converter with rotor and stator, for instance in a corresponding cavity. The support housing itself may in an embodiment be adapted to the particular design of the vehicle and for instance be designed rectangularly. According to another embodiment, the support housing is formed substantially cylindrical and, e.g., oriented with its longitudinal axis in parallel with the above indicated drive axis. In another embodiment, the support housing is formed symmetrically or rotationally symmetrical along the drive axis.

As the support housing however has not necessarily to be formed entirely cylindrical, the term of diameter of the first and second section is in the context of the present invention understood as the respective maximum linear expansion of the respective section in a radial direction and thus perpendicular to the drive axis.

The support housing may be made from any suitable material, for example steel, aluminum, molding material, or composite materials. In an embodiment, the support housing is made from stainless steel. The support housing may be formed in one piece or in multiple pieces, wherein, e.g., the support housing and particularly the first and the second sections are formed integrally.

The support housing may in an embodiment comprise one or more openings for cooling and/or to feed-through components, for example a shaft or electric mains. According to another embodiment, the support housing is substantially closed during operation to avoid contamination of the movable parts. In the latter case, the support housing may, e.g., be formed with a cavity for at least partial arrangement of rotor and stator. In a further embodiment, the cavity is formed at least sectionally in the first section of the support housing.

According to another embodiment, the support housing is alternatively or additionally formed with cooling elements or cooling ribs or cooling plates, especially on the outside of the first section, to further enhance the heat dissipation.

In addition to the electromechanical energy converter, the support housing may certainly comprise further components such as the power transmission device discussed in the preceding and/or a control device for the energy converter.

The first and second sections are, as discussed in the preceding, arranged axially. In this connection, the sections generally may be arranged along the drive axis in a spaced way, where applicable, by another section, wherein in one exemplary embodiment the first and the second section of the support housing are arranged axially next to each other.

The dimensions of the first and second section of the support housing may be chosen according to the respective application, wherein the diameter of the first section may in one embodiment be appropriately large to allow best possible heat dissipation. In case of application of the system as drive for an e-bike, the diameter may be chosen for example between 5 and 10 cm. The second section comprises, as discussed in the preceding, a smaller diameter than the first section, wherein the diameter of the second section may, e.g., amount to 25 to 50% of the diameter of the first section.

According to another embodiment, the first section of the support housing comprises fastening means for connection to the electric vehicle. Besides an enhanced stability of the entire design, the present embodiment allows an even more enhanced cooling of the electromechanical energy converter as the generated heat can be dissipated not only via ambient air but partially also via the vehicle frame and, where applicable, via parts attached to the support housing such as a side stand. Certainly, the connection should provide a good thermal contact.

The fastening means may comprise all appropriate forms and may, e.g., be formed by one or more bolted connections or corresponding bores. The fastening means may be formed integrally with the support housing during its production or can be subsequently connected to it, for instance by welded joints. The fastening means may be formed for connection to a fork-end of a vehicle frame.

According to another embodiment, the second section of the support housing comprises an axial passage opening and the rotor comprises a rotor shaft, wherein the rotor shaft extends through the passage opening.

The present embodiment allows an easy connection of the rotor to the power transmission device via the rotor shaft extending through the opening. In this connection, the rotor shaft acts for transmission of the torque between energy converter and power transmission device.

In this context, the rotor may, e.g., be formed with a rotor wheel, if applicable cylindrical, arranged in the first section and connected to the rotor shaft. The rotor wheel is in the present context used during operation to generate a magnetic field, i.e. depending on the construction of the energy converter, it can comprise at least an electric coil and/or a magnet. In case of an IPM machine, the magnets may for example be embedded in a rotor sheet plate.

According to another embodiment, the diameter of the rotor shaft is smaller than the diameter of the rotor wheel, so that the heat conduction from the energy converter in direction of the power transmission device is as low as possible. Particularly in another embodiment, the diameter of the rotor shaft corresponds to half the diameter of the rotor wheel at maximum. In case of application of the system as drive of an e-bike, the diameter of the rotor shaft may for instance be 1-2 cm.

As mentioned in the preceding, the second section of the support housing is formed for bearing of the rotor and/or the connecting element. According to another embodiment, the second section comprises at least a radial outer surface formed for bearing of the connecting element.

In this context, the outer surface of the second section is understood as an area of the support housing radially opposite to the axial passage opening. The radial outer surface may for example be arranged parallel to the drive axis and particularly formed cylindrically. According to another embodiment, the radial outer surface is arranged coaxially with the drive axis.

Such an arrangement further enhances the stability of the system, especially since possible transverse forces affecting the connecting element can be safely dissipated. This is particularly advantageous in case of application of the system as pedal-operated generator due to the oscillating pedaling movement during operation.

According to another embodiment, at least a first bearing unit is provided, bearing the connecting element pivotably on the second section of the support housing and in particular on the radial outer surface. The relatively small radial diameter of the second section allows here an application of bearing units with small diameters which further reduces the production costs of the converter system while the exterior arrangement on the support housing advantageously further enhances the stability of the design.

The bearing unit can be of all suitable designs, for example, the bearing unit is a roller bearing, in particular a radial bearing. According to one embodiment, the bearing unit is arranged coaxially with the drive axis.

The power transmission device is connected to the rotor of the energy converter and to the connecting element for transmission of a torque. For this purpose, the power transmission device may, as discussed at the beginning, be of all suitable designs and respectively be connected to the rotor or the rotor shaft of the energy converter.

According to an embodiment, the power transmission device and the electromechanical energy converter are arranged along the drive axis in such way that the rotor shaft extends axially into the power transmission device. An arrangement of this kind allows a particularly compact design of the present converter system.

With appropriate formation of the rotor shaft, the power transmission device may in one embodiment be arranged axially next to the second section of the support housing so that the rotor shaft connects the power transmission device with the rotor or the rotor wheel through the axial passage opening in the support housing mentioned at the beginning. According to a further embodiment, the power transmission device is arranged in the area of the second section of the support housing.

As already discussed in the preceding, the power transmission device may be of all suitable forms. In one embodiment, the power transmission device comprises at least a gear mechanism. The gear mechanism comprises a gear ratio or gear reduction adapted to the respective application and hence allows further enhanced efficiency, as the operating speed range can be adjusted to the operating point of the energy converter. For application in an electric vehicle, the gear mechanism may in one embodiment comprise a gear ratio from approx. 1:10 to approx. 1:30, in another embodiment from 1:12 to 1:21, and in a further embodiment of 1:18.

The gear mechanism in this connection may comprise one or more gear stages and/or be formed as gearbox. The gear mechanism can for example be formed as toothed belt drive. Alternatively or in addition, the gear mechanism can be formed as CVT gearbox (Continuously Variable Transmission) and/or comprise a mechanical or electrical clutch. The control of an electronic gearbox and/or of an electronic clutch may take place through the initially mentioned control device.

According to a another embodiment of the invention, the power transmission device comprises a planetary gear. The planetary gear may in an embodiment comprise at least one axially arranged sun gear and may furthermore comprise one or more gear stages. The planetary gear may for example be formed as a series planetary gear train or stepped planetary gear. In another example, the planetary gear is a single-row stepped planetary gear, thus a gear with two gear stages altogether, but only one roller bearing per planetary set where applicable.

The sun gear can may be formed disc-shaped or cylindrical. In addition to the sun gear, the planetary gear may comprise a single or multiple planet wheels and/or a hollow wheel, wherein sun gear and planet wheel as well as planet wheel and hollow wheel are engaged with each other to transmit a torque. Depending on the arrangement, the gear wheels, i.e., sun gear, planet wheels and hollow wheel, may be formed with external and/or internal teeth. The at least one planet wheel may be pivotably connected to a static or rotational planet carrier.

According to another embodiment of the invention, rotor and sun gear are formed integrally. As a result, the design of the converter system is further simplified. The sun gear may be connected to the rotor for instance by means of a flexible coupling, so that the bearings do not get stuck upon deflection of the converter due to a non-stiff vehicle frame.

According to another embodiment, rotor and sun gear are formed at least partially hollow, which results in a reduced weight of the converter system. Furthermore, corresponding cavities can be used for instance for feed-through of electrical connection cables, shafts or for further enhanced cooling through flow of a fluid as air for example.

Upon application of the planetary gear, different arrangements regarding input and output are conceivable which are being outlined in the following. According to an embodiment of the invention, the converter system is a wheel drive system for electric vehicles, in particular for light electric vehicles.

Particularly with such arrangement, in one embodiment, the connecting element comprises a hollow wheel coaxially arranged to the sun gear, which is engaged to the sun gear through at least one planet wheel if applicable for the transmission of a torque. According to another embodiment, the hollow wheel comprises fastening means for connection to a wheel assembly of the electric vehicle such as a hub of a drive wheel or of an impeller wheel. In an alternative or additional embodiment, the hollow wheel is formed integrally with the hub or a hub body.

It is thus possible to form the power transmission device substantially coaxial with the wheel assembly of the electric vehicle, whereby a very compact assembly is given. The thereby resulting arrangement of the energy converter along the drive axis, yet sideways outside the wheel plane, is very advantageous as consequently during operation, a very good cooling is provided.

In the present embodiment of application of the converter system as wheel drive system for an electric vehicle, propulsion is effected by means of the energy converter constructed as a motor and thus by the sun gear connected to the rotor. The sun gear may be directly connected to the hollow wheel, appropriate for transmission of a torque, in one embodiment however, the sun gear is connected with at least one planet wheel and the planet wheel is connected to the hollow wheel to transmit a torque.

In this context, the planet wheel can, as discussed in the preceding, be pivotably mounted to a planet carrier, wherein the respective axis of rotation may be parallel to the drive axis. In another embodiment, the planet carrier is firmly connected with the support housing and in another embodiment with the second section of the support housing. Consequently, this results in a gear reduction from the rotor connected to the sun gear to the vehicle wheel.

As discussed in the preceding, the converter system according to the invention is flexible in use. Besides being formed as a drive system directly connected to a wheel assembly, the converter system may alternatively be used as bottom bracket generator and/or motor, in particular for a series hybrid electric vehicle.

In one embodiment and upon usage of the system as bottom bracket generator or motor, the planetary gear may be formed to transmit a force or a torque between sun gear and the connecting element being formed as a planet carrier. It is conceivable in this case that the hollow wheel may be connected to the support housing and the planet carrier is connected pivotably to the second section of the support housing.

Upon usage as pedal-operated generator, a pedal axis with respective pedals operable by foot drives for example the planet carrier. The planet wheels run on the internally teethed hollow wheel and drive the sun gear, so that a torque can be transmitted between the connecting element with pedal and the sun gear on the rotor of the energy converter.

According to another embodiment, the rotor comprises an axial cavity. In a further embodiment, the connecting element comprises a drive shaft that is at least sectionally arranged in the cavity. According to yet another embodiment, the axial cavity is formed continuously, that is as a passage opening, through rotor and support housing. It is thus possible, for instance for usage in a pedal-operated generator, to conduct the drive shaft/pedal axis in a straightforward manner through the support housing and the power transmission device, whereby a most compact design of the converter system is given. According to a further embodiment, the connecting element comprises two pedals connected to the drive shaft.

According to another embodiment of the invention, the support housing comprises a third axial section with at least a second bearing unit. The second bearing unit pivotably connects the drive shaft to the third section. As explained in the preceding, also the second bearing unit may be formed as roller bearing.

The present embodiment allows a particularly sturdy design of the converter system, as eventual transverse forces occurring during operation can securely be dissipated. According to a further embodiment, the second bearing unit is arranged coaxially with the drive axis on a radial outer surface of the third section of the support housing.

The arrangement of the individual sections of the support housing along the drive axis in general can be arbitrary and may be chosen according to the respective application. According to another embodiment, the third section is arranged on a side of the support housing axially opposite to the power transmission device. Hence the drive shaft is mounted axially on both sides of the electromagnetic energy converter, resulting in the system being particularly sturdy in the present embodiment.

According to a further embodiment of the invention, the converter system comprises a first and a second support housing with an energy converter each. The support housings are arranged along the drive axis and spaced through the power transmission arrangement, i.e., the first and the second support housings are arranged along the drive axis on opposing sides of the power transmission device.

The design of the converter system according to the present embodiment is for instance advantageous in an application as a wheel drive system to increase the maximum torque of the drive. Alternatively, smaller energy converters can be used for a required output, allowing to reduce the design size of the converter system once more.

In this context, the first and the second support housings, the related two energy converters as well as the power transmission device can be formed as described above, wherein it is not necessary that the support housings and/or the energy converters are formed identically in any case. For instance, it is conceivable that the first energy converter features a different output power than the second energy converter. Thus driving power, depending on the weight to be conveyed or according to the incline, may be controlled by engaging or disengaging individual energy converters, by what the efficiency of the converter system is further increased.

According to a further embodiment, the first and second support housings are arranged in such a way that the rotor shafts of the respective energy converters extend into the power transmission device. To that end, the support housings with their respective second sections may be arranged opposing to each other at the power transmission device.

In another embodiment, the energy converters arranged in the first and second support housing comprise an integrally formed rotor. In this context, in particular a first rotor wheel can be arranged in the first section of the first support housing and a second rotor wheel can be arranged in the second section of the second support housing. According to another embodiment, the rotor is further integrally formed with the at least one sun gear.

According to another aspect, an electric vehicle, in particular a light electric vehicle, comprises at least a converter system. In this context, the converter system is formed with a support housing for connection to the vehicle, an electro-mechanical energy converter, which is at least partially arranged in the support housing and a power transmission device. The energy converter has at least a stator as well as a rotor that is rotatable about a drive axis relative to the stator. The power transmission device connects the rotor to a connecting element. The support housing comprises at least a first axial section and a second axial section, wherein the first section has a larger diameter than the second section in a direction perpendicular to the drive axis. The second section is formed for bearing of the rotor and/or of the connecting element; stator and rotor of the energy converter are arranged in the first axial section.

Concerning the formation of the individual components of the electric vehicle according to the present aspect, reference is made to the preceding description of embodiments of the converter system.

The invention is hereinafter explained with reference to preferred embodiments.

BRIEF DESCRIPTION OF THE DRAWINGS

It is shown in:

FIG. 2 the embodiment of FIG. 1 in a schematic sectional view along a drive axis;

DETAILED DESCRIPTION OF PREFERRED EMBODIMENTS

Figure 1A:
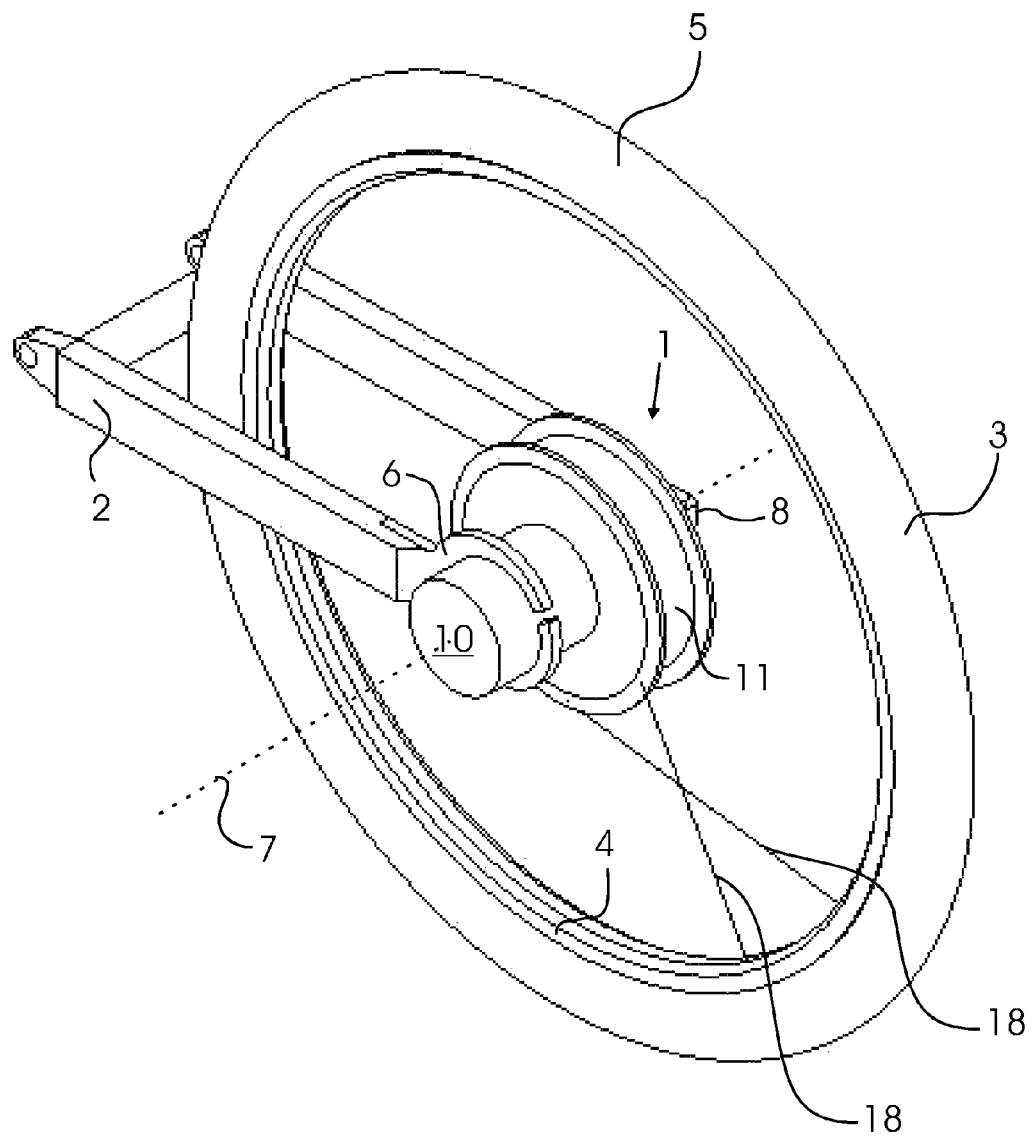
FIG. 1a a first embodiment of the converter system according to the invention in a perspective view in the position of use in a wheel assembly of an electric vehicle.
Figure 1B:
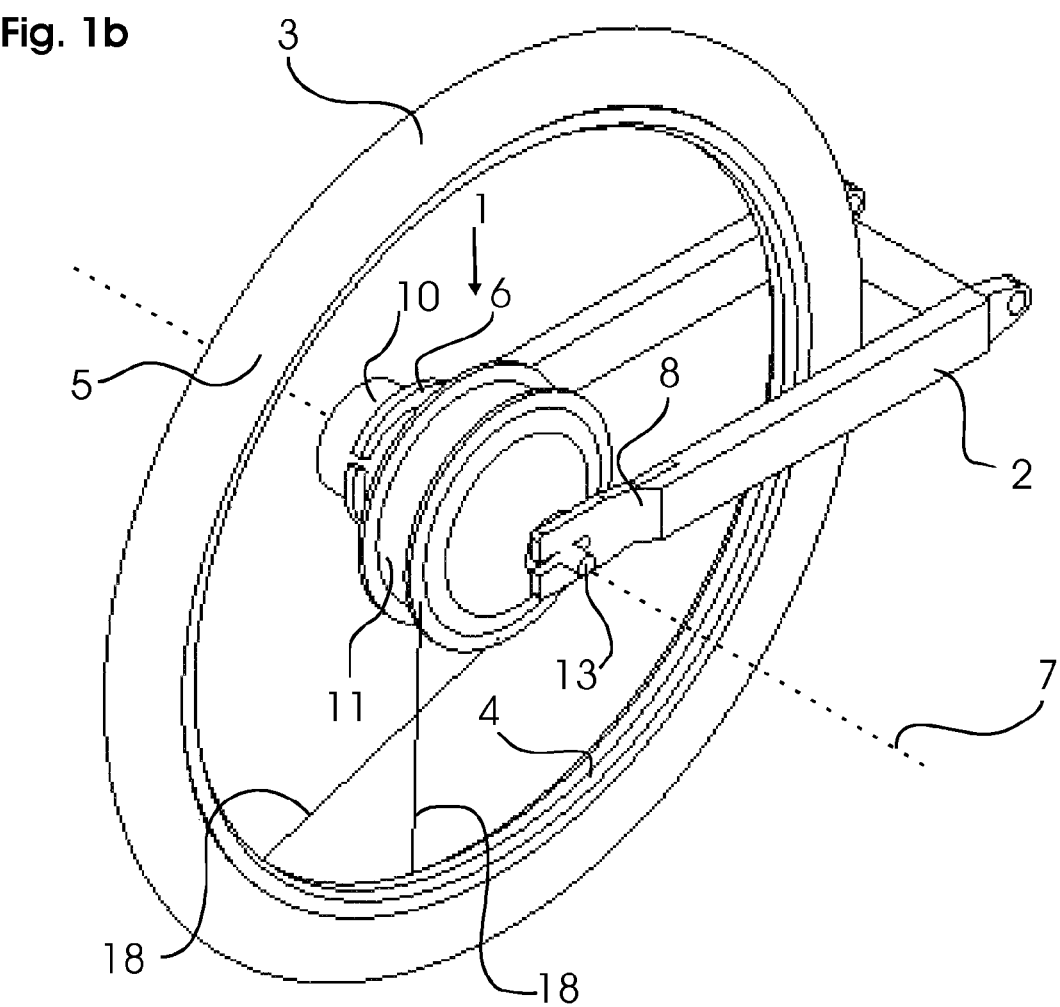
FIG. 1b the embodiment of FIG. 1a in a second perspective view.

The FIGS. 1a and 1b show a first embodiment of a converter system 1 according to the invention in perspective views. The converter system 1 is in the FIGS. shown in the position of use on a rear wheel assembly of an electric vehicle—in this case an electric moped. The electric vehicle comprises a frame (not shown) to which a rear swing arm 2 is connected. As shown, the rear swing arm 2 is formed as screw-mountable to the frame to allow easy assembly and disassembly of the arrangement. The wheel assembly further comprises an impeller wheel 3 that in the present form comprises a rim and a corresponding tubular tire 5.

As can be taken from the views of FIG. 1a and FIG. 1b, the converter system 1 comprises a support housing 10 which is connected to the frame of the electric vehicle by a ring-shaped formed fork-end 6 of the rear swing arm 2. The support housing 10 is formed cylindrically and arranged coaxially to a drive axis 7. In axial direction next to the support housing 10 of the converter system 1, a hollow wheel 11 is arranged that includes on the one hand a planetary gear 12 (not shown in FIGS. 1a and 1b) and is formed on the other hand for connection to the impeller wheel 3. The hollow wheel 11 is in this context formed as a hub shell and comprises sockets (not shown) for a multitude of spokes 18 that connect the hollow wheel 11 to the impeller wheel 3. The hollow wheel 11 or the hub shell can certainly comprise a braking system and/or chain rings for a gear, which is however not shown here for reasons of clarity.

On the side of the hollow wheel 11 opposite to the support housing 10, the converter system 1 is formed with a carrying axis 13 arranged axially along the drive axis 7, being held in an additional fork-type fork-end 8 of the rear swing arm 2 in the position of use.

The detailed design of the present first embodiment of the converter system 1 is in the following explained based on the schematic view of FIG. 2. At this, FIG. 2 shows the converter system 1 in a sectional view along the drive axis 7. For reasons of clarity, the further components of the electric vehicle such as rear swing arm 2 and impeller wheel 3 are not shown in FIG. 2.

As already mentioned at the beginning with reference to the FIGS. 1a and 1b, the converter system 1 comprises three main components according to the present embodiment, namely support housing 10, hollow wheel 11 with planetary gear 12 and carrying axis 13. The support housing comprises a first section 14 arranged outside the wheel plane 9 and a second section 15 arranged axially next to the first section 14. As shown, the first section shows in a direction, perpendicular to the drive axis 7, thus in a direction parallel to the wheel plane 9, a larger diameter than the second section 15, which is explained in detail in the following.

As FIG. 2 further implies, the support housing 10 is integrally formed with the first and the second section 14, 15. The support housing 10 features a rotationally symmetrical cylindrical basic form and is arranged coaxially along the drive axis 7. According to the present embodiment, the support housing 10 is comprised of stainless steel.

The first section 14 of the support housing 10 includes an electromechanical energy converter, namely a motor 20 according to the present embodiment. The motor 20 comprises a hollow-cylindrical stator 21, coaxially arranged in the first section 14, which is formed in the present embodiment in a manner known from prior art with several electrical coils (not shown) for generating a magnetic field. The motor 20 further comprises a rotor 22, rotatable about the drive axis 7, which comprises a cylindrically formed rotor wheel 23 and a rotor shaft 24, extending axially from the rotor wheel 23 into the second section 15 of the support housing 10.

The rotor wheel 23 comprises in the present case permanent magnet arrangements, so that during operation, i.e., when supplying the coils of the stator 21 with an electric current, a magnetic rotating field is being generated, moving the rotor 22.

The motor 20 is in the present case formed as a three-phase brushless DC motor. For reasons of clarity, the electrical connections, an eventually necessary commutator, as well as a control device for the motor 20 are not shown in the figures. The motor 20 exhibits in the present example a continuous torque of about 1 to 3 Nm and can generate a peak torque of 4 to 10 Nm. Due to the reduction gear 12, the converter 1 thus provides a continuous torque between 30 to 60 Nm as well as a peak torque of about 100 Nm.

As it can be further seen from FIG. 2, the rotor shaft 24 extends through the second section 15 of the support housing 10. The second section 15 is hereby formed with an axial passage opening, its diameter being only slightly larger than the diameter of the rotor shaft 24.

The second section 15 of the support housing 10 thus serves on one hand for connection of the rotor shaft 24 and thus for the transmission of a force or a torque from the motor 20 to a power transmission device formed as a planetary gear 12. The second section 15 however further serves for the pivotable mounting of the connecting element formed as hollow wheel 11. To that end, a radial bearing 25 is attached to a radial outer surface 16 of the second section 15 of the support housing 10. The second section 15 of the support housing 10 thus serves in the present case for the pivotable mounting of the output of the converter system 1. At this, the small diameter of the second section 15 of the support housing 10 is advantageous, as conventional radial bearings 25 with relatively small inner diameters of about 30 mm to 40 mm can be used as a consequence.

Moreover, the heat generated in stator 21 during operation can be well dissipated through the relatively large surface of the first section 14 of the support housing 10. In this context, on one hand the arrangement of the first section 14 in the support housing 10 outside the wheel plane 9 provides good cooling of the motor 20 through ambient air or during operation through airstream, and on the other hand the circular contact area of the fork-end 6 of the rear swing arm 2 provides good thermal contact between support housing 10 and the frame of the electric vehicle (not shown), so that the heat generated in the motor 20 can also be advantageously dissipated via the rear swing arm 2 and the frame of the electric vehicle.

According to the present embodiment, the hollow wheel 11 is further mounted to the carrying axis 13 via a second radial bearing 26. For this purpose, the carrying axis 13 comprises a hollow-cylindrically formed support section, wherein the diameter of the support section corresponds in a direction, perpendicular to the drive axis, to the diameter of the second section 15 of the support housing 10.

The present arrangement with two radial bearings 25, 26 provides a particularly advantageous bearing of the hollow wheel 11 and thus of the impeller wheel 3 connected to the hollow wheel, so that in particular transverse forces, for instance when taking bends, can be dissipated safely to the frame of the electric vehicle via support housing 10 and carrying axis 13 and the rear swing arm 2. Further the arrangement allows a substantially closed form of the hollow wheel 11, so that the planetary gear 12 arranged in the hollow wheel 11 and also the motor 20 are protected from moisture and contamination without the need for particular sealing measures along the rotor shaft 24.

In the position of use with current-carrying motor 20, the field acting between stator 21 and rotor 22 generates a force or a torque for the propulsion of the hollow wheel 11. Here, the generated torque is being transferred from rotor 22 to the planetary gear 12 and thus to the hollow wheel 11. For this purpose, the rotor shaft 24 is integrally formed with an axially arranged sun gear (not shown) with external teeth. The rotor shaft 24 formed as sun gear moves three or four planet wheels 27 in total via the teeth of the sun gear, comprising also external teeth for engaging with the sun gear. The planet wheels 27 are mounted pivotably between a first planet carrier 28a and a second planet carrier 28b. The rotation axes of the planet wheels 27 run parallel to the drive axis 7. As can be seen in particular in FIG. 2, the first planet carrier 28a is connected torque-proof to the second section 15 of the support housing 10 and the second planet carrier 28b is connected torque-proof to the support section of the carrying axis 13. The planet wheels 27 are arranged evenly on the perimeter of the planet carriers 28a, 28b. For further stabilization, three arms 29 are arranged in radial direction between the planet wheels 27, connecting the two planet carriers 28a, 28b torque-proof with each other.

On the output side, the planet wheels 27 further engage in a gear ring 30 that is torque-proof connected to the hollow wheel 11, which comprises internal teeth corresponding to the planet wheels 27. Thus, a drive torque of the motor 20 can be transferred to the hollow wheel 11 via sun gear, planet wheels 27 and gear ring 30, and thus it can be used for propulsion of the impeller wheel 3 of the electric vehicle.

The planetary gear 12 is formed as a single-row stepped planetary gear and thus comprises two gear stages. Through the arrangement of the drive on the sun gear and of the output on the hollow wheel 11, a gear reduction with a gear ratio of about 1:16 thus is given. The gear ratio should be chosen between 1:12 and 1:21.

For enhancement of the efficiency, the hollow wheel 11 can comprise a lubricant, so that the planetary gear 12 or the sun gear is at least partially wetted with the lubricant. Thus the wear in the planetary gear 12 can be reduced advantageously. The form of the converter system 1 according to the present embodiment is particularly in this context advantageous as the heat generated in the motor 20 is only to a minor degree transferred to the hollow wheel 11 via the second section 15 of the support housing 10 and thus to the lubricant.

Moreover the present embodiment of the converter system 1 is advantageous, as the arrangement allows the use of the shown cylindrically formed motor 20, which is more cost-effective to manufacture compared to disc-type motors and still can generate a relatively high torque.

For applications in which a particularly high torque is needed, the converter system 1 can be alternatively formed with multiple motors. A corresponding second embodiment of a converter system 1' according to the invention is shown in FIG. 3 in a schematic sectional view corresponding to the view of FIG. 2.

Figure 3:
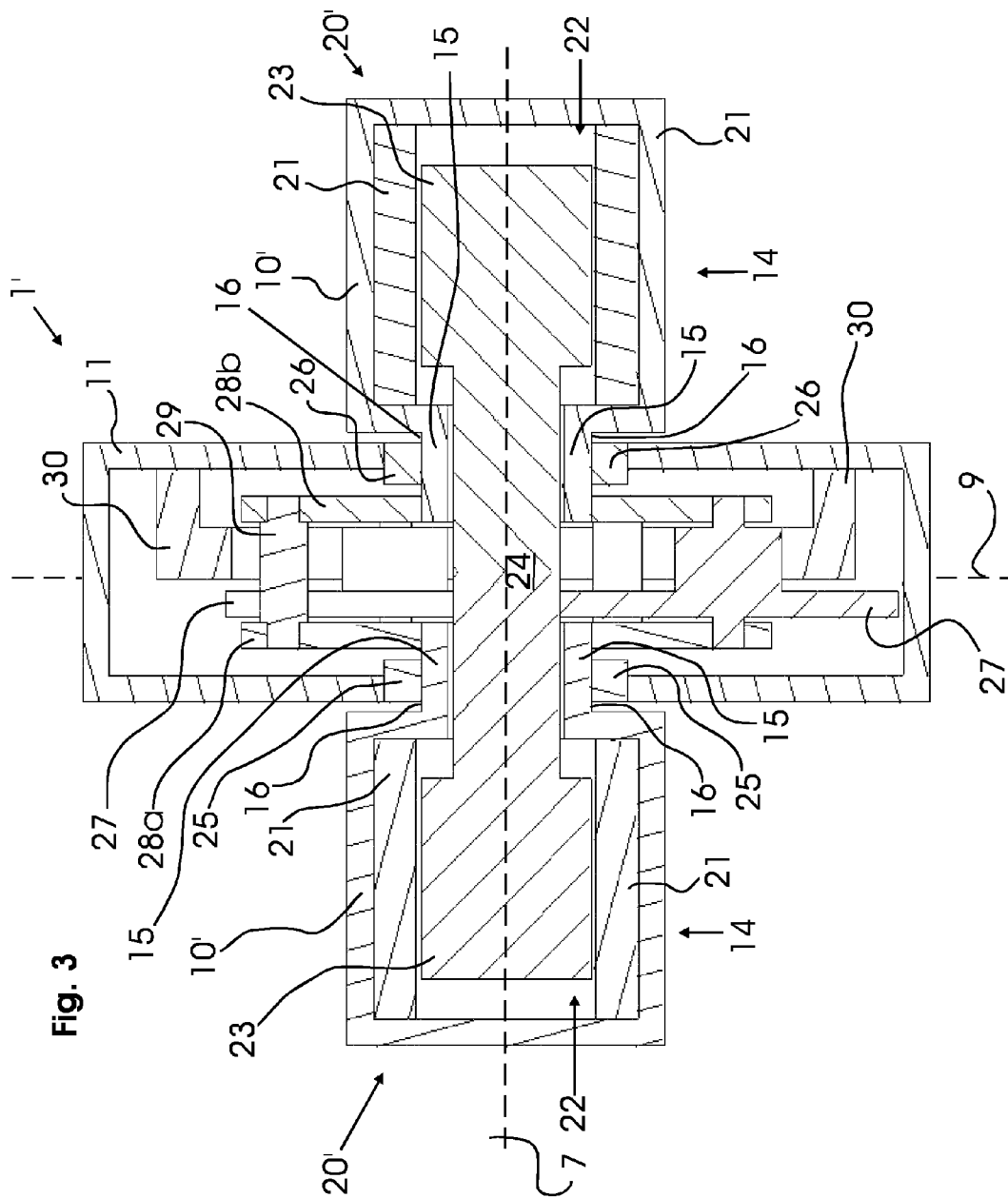
FIG. 3 a second embodiment of the converter system according to the invention in a schematic sectional view along the drive axis and FIG. 4 a third embodiment of the converter system according to the invention in a schematic sectional view along the drive axis.

The second embodiment of the converter system 1' substantially corresponds to the first embodiment explained with reference to the FIGS. 1 and 2, wherein the converter system 1' according to FIG. 3 is formed with two motors 20' in total. The motors 20' are formed smaller in relation to the previously explained motor 20, resulting in a more compact design of the converter system 1'.

Each of the motors 20' is arranged in a corresponding support housing 10', wherein the basic layout of the support housings 10' with a first section 14 and a second section 15 corresponds to the embodiment explained above with reference to the FIGS. 1 and 2.

The support housings 10' and the motors 20' are substantially formed axially symmetrical to the wheel plane 9, wherein the motors 20' comprise a common rotor shaft 24. The motors 20' again are formed as cylindrical, three-phase and brushless DC motors, the propulsion of the sun gear (not shown) formed integrally with the rotor shaft 24 takes place as explained before.

The stators 21 and the rotors 22 of the motors 20' are here mechanically aligned in a way that no phase shift of the induced voltage occurs. It is thus possible to operate both motors 20' with only one control device or power electronics (not shown). For this purpose, for instance a sensor for rotor position detection can be arranged that is connected to the control device. The electrical connection and the contact of the individual motors phases is formed in such a way that there is electrical symmetry and thus no or only minimum compensating currents occur between the motors.

Compared to the embodiment explained beforehand according to the FIGS. 1 and 2, the ratio of surface to volume of the support housings 10' in the present case is enhanced, meaning that the heat generated in the motors 20' can be better dissipated to ambient air or to the rear swing arm 2. Thus, the motors can be operated permanently with high currents, so that a high continuous torque is possible.

The initially mentioned control device (not shown) may, in an arrangement with multiple motors 20', particularly be formed to generate a steady current profile with only limited ripple. The control device can for example comprise a field-oriented control, at this a control with so-called "field weakening" allows a large speed range so that a manual gearbox can be relinquished where appropriate. The control device can be placed in an elongated housing (not shown) on the inside or outside of the rear swing arm 2, allowing uncomplicated maintenance.

The control device can furthermore be formed to allow the impeller wheel 3 to slow down freely. For this purpose, the control device can comprise an electronic freewheel circuit. The electronic freewheel circuit is parameterizable and allows for compensation of no-load losses to either drive the motors 20' to a limited extent or to slightly decelerate them, so that it is possible to brake electrically and to accordingly recuperate energy.

In a not shown, alternative embodiment, a half pole pitch spatially distorts the rotors 22 and stators 21 of the motors 20'. This measure leads to little torque ripple, such as with use of a multi-pole motor, but it is less cost-intensive as only a control device for instance for three-phase motors 20' can be employed.

An alternative third embodiment of a converter system 1" according to the invention is shown in a schematic sectional view in FIG. 4. The converter system 1" according to the present embodiment is formed as pedal-operated generator or motor for connection in the bottom bracket area of an electric bicycle, for instance.

The schematic view of the converter system 1" is here sectionally shown along a drive or pedal axis 40. The present arrangement as bottom bracket generator or motor is particularly usable for a series hybrid electric vehicle, meaning a vehicle where propulsion can take place by foot and in support through a battery powered electric motor.

The embodiment of the converter system 1" according to FIG. 4 corresponds substantially to the embodiments explained with reference to the FIGS. 1-3; corresponding components or modules are thus labeled with identical numbers.

As explained previously, the converter system 1" comprises also according to the present embodiment a support housing 10" with a first section 14 and a second section 15. In the first section 14 of the support housing 10, a pedal-operated generator 41 is arranged in the present case, comprising a hollow-cylindrical stator 21' and a rotor 22'. The rotor 22 here is also formed with a rotor wheel 23' and a rotor shaft 24'. In contrast to the embodiments explained before, the rotor 22' is however formed along the pedal axis 40 with an axially continuous cavity. In the cavity, and thus coaxially to the rotor 22', a drive shaft 42 is arranged, formed as pedal axis. The drive shaft 42 is formed for end connection with corresponding pedals (not shown). For this purpose, the drive shaft 42 comprises a connecting section 43, mounted in the present case on a radial outer surface 16 of a third section 17 of the support housing through means of another radial bearing 44. On the side opposite to the third section 17 of the support housing 10", the drive shaft 42 is integrally formed with a connecting element connected as planet carrier 28'*b*. The planet carrier 28'*b* is in the present case formed for connection to another pedal (not shown) and is, as explained previously, torque-proof connected through three arms 29 to the planet carrier 28'*a*.

In the present application of the converter system 1" as pedal generator, kinetic energy is provided by foot through the pedals (not shown) connected to the drive shaft 42. The kinetic energy is transmitted through the planet carriers 28'*a* and 28'*b*, which is torque-proof connected to the drive shaft.

The planet carrier 28'a, 28'b is in this embodiment mounted to the radial outer surface 16 of the second section 15 of the support housing 10" by means of the radial bearing 25.

According to FIG. 4, the radial bearings 25, 44 have a smaller diameter than the first section 14 of the support housing 10". During operation, the planet carriers 28'a, 28'b propel three radial evenly spaced planet wheels 27 that run between a gearbox housing 45, torque-proof connected to the support housing 10" and having internal teeth, and the sun gear (not shown) that is integrally formed with the rotor shaft 24', which thus during operation transmit a force or a torque from the planet carriers 28'a, 28'b to the rotor 22' of the pedal generator 41. Hereby, the rotor 22' is propelled, whereby a magnetic field occurs in turn between rotor wheel 23' and stator 21' and an electrical current is being generated in the generator 41.

The electrical energy generated during operation can be directly stored in the motor or, if the motor is currently not accepting energy, in a battery or an accumulator, and can be supplied as necessary for instance to a drive arrangement formed according to the FIGS. 1-3.

The invention has been explained in the preceding based on embodiments above. The invention is however not limited to the described embodiments. In particular, the embodiments explained above allow numerous amendments and/or additions. For example, it is conceivable in a further embodiment that the pedal generator 41 according to the embodiment of FIG. 4 is operable as bottom bracket motor,
the drive shaft 42 comprises one or more chain rings which are formed for connection with a sprocket on the rear wheel of the vehicle by means of a chain or a toothed belt,
the converter system 1 is not connected on both sides with the swing arm 2 in the embodiment of the FIGS. 1 to 2, but only through the support housing 10, for example for application in three- or four-wheeled vehicles,
in all above-mentioned embodiments, a mechanical or electrical freewheel is provided for,
a brake unit, gear shift and/or clutch is provided for between rotor 22, 22' and planetary gear 12, 12' or hollow wheel 11,
in the embodiments according to FIGS. 1 to 3, the hollow wheel 11 is integrally formed with an impeller wheel 3 of the electric vehicle,
the support housing 10 is formed at least partially from plastics or aluminum,
the first section 14 and the second section 15 of the support housing are connected to each other by means of a screw connection or a quick release fastener, and/or
the motor 20 is formed as a synchronous machine (PMSM).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. Electromechanical converter system for an electric vehicle, in particular for a light electric vehicle, comprising
a support housing for connection to the vehicle, the support housing comprising at least a first axial section and a second axial section;
an electromechanical energy converter arranged at least partially in the support housing with at least one stator and one rotor, the stator and the rotor are at least partially arranged in the first axial section of the support housing and the rotor being rotatable about a drive axis relative to the stator, and
a power transmission device which connects the rotor to a connecting element, the connecting element comprising a hollow wheel, formed as a hub shell; wherein
the power transmission device comprises a planetary gear, the planetary gear being arranged in the hollow wheel; and wherein
in axial direction next to the hollow wheel the support housing is arranged so that the second axial section of the support housing is formed for bearing of the hollow wheel and the first axial section is formed for housing the stator and the rotor, said first axial section is arranged substantially adjacent to and outside of the hollow wheel;
the first axial section of the support housing having a larger maximum linear expansion in a radial direction than the second axial section of the support housing.

2. Converter system according to claim 1, wherein the first axial section of the support housing comprises fastening means for connection to the electric vehicle.

3. Converter system according to claim 1, wherein the second axial section of the support housing comprises an axial passage opening and the rotor comprises a rotor shaft and wherein the rotor shaft extends through the opening.

4. Converter system according to claim 1, wherein the second axial section of the support housing comprises a radial outer surface that is formed for bearing of the connecting element.

5. Converter system according to claim 1, wherein a bearing unit is provided that pivotably connects the connecting element to the second axial section of the support housing.

6. Converter system according to claim 1, wherein the support housing and the power transmission device are arranged along the drive axis such that the rotor shaft extends axially into the power transmission device.

7. Converter system according to claim 1, wherein the planetary gear comprises at least one axially arranged sun gear.

8. Converter system according to claim 7, wherein rotor shaft and sun gear are formed integrally.

9. Converter system according to claim 8, wherein the connecting element comprises a ring gear coaxially arranged to the sun gear, which ring gear is engaged with the sun gear for transmitting a torque.

10. Converter system according to claim 9, wherein the ring gear comprises fastening means for connection to a wheel arrangement of the electric vehicle.

11. Converter system according to claim 7, wherein the connecting element comprises a ring gear coaxially arranged to the sun gear, which ring gear is engaged with the sun gear for transmitting a torque.

12. Converter system according to claim 11, wherein the ring gear comprises fastening means for connection to a wheel arrangement of the electric vehicle.

13. Converter system according to claim 1, wherein the connecting element comprises a drive shaft that is at least partly arranged in an axial cavity formed in the rotor.

14. Converter system according to claim 13, wherein the support housing furthermore comprises a third axial section with at least a second bearing unit and wherein the second bearing unit pivotably connects the drive shaft to the third axial section of the support housing.

15. Converter system according to claim 14, wherein the third axial section is arranged on a side of the support housing arranged axially opposite to the power transmission device.

16. Converter system according to claim 1, wherein at least a first and a second support housing with at least one energy converter each are provided and the first and the second support housing are arranged along the drive axis and spaced by the power transmission device.

17. Electric vehicle, in particular light electric vehicle, with a converter system according to claim 1.

* * * * *